(12) United States Patent
Dwars et al.

(10) Patent No.: US 9,932,811 B2
(45) Date of Patent: *Apr. 3, 2018

(54) METHOD AND SYSTEM FOR DAMPING VIBRATIONS IN A TOOL STRING SYSTEM

(71) Applicant: SHELL OIL COMPANY, Houston, TX (US)

(72) Inventors: Sicco Dwars, Rijswijk (NL); Douwe Johannes Runia, Rijswijk (NL); Ivo Petrus Jozef Maria Stulemeijer, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 428 days.

This patent is subject to a terminal disclaimer.

(21) Appl. No.: 14/778,442

(22) PCT Filed: Mar. 19, 2014

(86) PCT No.: PCT/EP2014/055494
§ 371 (c)(1),
(2) Date: Sep. 18, 2015

(87) PCT Pub. No.: WO2014/147118
PCT Pub. Date: Sep. 25, 2014

(65) Prior Publication Data
US 2016/0273332 A1   Sep. 22, 2016

(30) Foreign Application Priority Data

Mar. 21, 2013 (EP) .................................. 13160308
Aug. 6, 2013 (EP) .................................. 13179337

(51) Int. Cl.
*E21B 44/00* (2006.01)
*E21B 47/00* (2012.01)
(Continued)

(52) U.S. Cl.
CPC .............. *E21B 44/00* (2013.01); *E21B 44/04* (2013.01); *E21B 45/00* (2013.01); *E21B 47/00* (2013.01);
(Continued)

(58) Field of Classification Search
CPC .......... E21B 44/00; E21B 44/04; E21B 47/00; E21B 47/0007; E21B 45/00;
(Continued)

(56) References Cited

U.S. PATENT DOCUMENTS

| 5,117,926 A | 6/1992 | Worrall et al. |
| 7,645,124 B2 | 1/2010 | Garlow |
| 2015/0322766 A1* | 11/2015 | Veltman .................. E21B 44/00 340/853.6 |

FOREIGN PATENT DOCUMENTS

| EP | 2364397 | 6/2010 |
| WO | 2010064031 | 6/2010 |
| WO | 2012041745 | 4/2012 |

OTHER PUBLICATIONS

PCT International Search Report, Application No. PCT/EP2014/055494 dated Jun. 18, 2014.
(Continued)

Primary Examiner — George S Gray

(57) ABSTRACT

The invention provides a control system and method for limiting vibrations in a tool string system. The system comprises a pump connected to a rotatable tool string driven by a drive system. The control system comprises feedback of both torque and rotational speed signals into a controller. An objective of said controller is to maintain the drive speed over torque ratio equal to the connected tool string impedance (Z). A secondary objective, for lower frequencies, is to approach and maintain a setpoint speed as drive rotation speed. The system includes a rotational speed sensor and a torque sensor, with the latter optionally replaced by a motor
(Continued)

torque signal already available from a variable frequency drive (VFD) for an AC motor and the current safeguarding signal for a DC motor.

19 Claims, 10 Drawing Sheets

(51) Int. Cl.
    *E21B 45/00* (2006.01)
    *G05B 19/02* (2006.01)
    *E21B 44/04* (2006.01)
    *G01L 3/00* (2006.01)
    *G01P 3/44* (2006.01)
    *G05B 19/402* (2006.01)
    *E21B 43/12* (2006.01)

(52) U.S. Cl.
    CPC ............ E21B 47/0007 (2013.01); G01L 3/00 (2013.01); G01P 3/44 (2013.01); G05B 19/402 (2013.01); *E21B 43/126* (2013.01); *G05B 2219/45129* (2013.01)

(58) Field of Classification Search
    CPC ..... E21B 43/126; G05B 19/402; G05B 19/02; G05B 2219/45129; G01L 3/00; G01P 3/44
    See application file for complete search history.

(56) References Cited

OTHER PUBLICATIONS

Halsey et al., "Torque Feedback Used to Cure Slip-Stick Motion", 1988, SPE 18049.
Puebla et al., "Suppression of stick-slip in drillstrings: A control approach based on modeling error compensation", 2007, Journal of Sound and Vibration 310 (2008) 881-901.

* cited by examiner

METHOD AND SYSTEM FOR DAMPING VIBRATIONS IN A TOOL STRING SYSTEM

CROSS-REFERENCE TO RELATED APPLICATIONS

The present application is a National Stage (§ 371) of International Application No. PCT/EP2014/055494, filed Mar. 19, 2014, which claims priority from European Application No. 13160308.6, filed Mar. 21, 2013, and also claims priority from European Application No. 13179337.4, filed Aug. 6, 2013, the disclosures of each of which are hereby incorporated by reference in their entirety.

The present invention relates to a method and to a system for damping vibrations in a tool string system.

This invention relates generally to mitigation of vibrations in systems having a mechanical driving element connected via a rod or tube of substantial length, to a mechanically driven element. The system may include a pump system for pumping oil or a drilling system.

As disclosed in U.S. Pat. No. 7,645,124, in general, any drive connection in a mechanical system exhibits some degree of compliance, i.e. a tendency to yield or bend under load, within the elastic limit of the material, or materials, of the components making up the connection. As a result of this compliance, a driving force exerted at one end of the connection causes the connection to stretch, bend, and/or twist, depending upon the nature of the connection, in such a manner that the driving force will be out of phase with a corresponding reaction of a driven element at the opposite end of the connection, due to inertia of the driven component which must be overcome in order for the driving force to cause a motion of the driven element consistent with the motion of a driving element applying the driving force.

Under certain circumstances, depending upon construction of the system, compliance in the connection will cause an undesirable oscillating or resonant motion to be set up between the driving and driven elements.

Such oscillating behavior is sometimes observed in a system having an engine connected to an engine testing dynamo through a connection including an in-line torque sensor. Such torque sensors typically include a resilient element operatively joining an input element and an output element of the torque sensor. The resilient element allows the input and output elements to twist slightly, with respect to one another, in response to torque being transmitted through the torque sensor. This twisting can be measured and used to determine the torque being transmitted by the coupling.

During an increase and/or decrease in torque, however, the resilient element may cause the system to oscillate as energy is alternately stored and released by the resilient element, until equilibrium is achieved. Such oscillation can be damaging or otherwise detrimental to operation of the system and its components. It is desirable, therefore, to provide an apparatus and method for estimating such behavior, and for controlling the system in such a manner that the undesirable oscillatory or resonant behavior is precluded and/or held within acceptable bounds. It is also highly desirable, in some circumstances, to provide for such control without having sensors located at the driven element, i.e. at the dynamo in the example given above, in order to remove complexity and cost and to improve reliability of the system.

In some systems, oscillating or resonant behavior takes a form known as stick-slip behavior. Stick-slip behavior refers to an undesired intermittent form of motion that sometimes occurs between relatively moving parts where the coefficient of kinetic friction between the parts is less than the coefficient of static friction between the parts. Contacting surfaces of the parts will stick to one another until a driving force, being exerted on one of the parts by a drive element to cause relative movement between the parts, reaches a value high enough to overcome the static frictional force between the contact surfaces.

Due to the fact that the static coefficient of friction is higher than the kinetic coefficient of friction, once the static friction force is overcome by the driving force, the contact surfaces of the parts will tend to move freely and rapidly with respect to one another.

Because there is an inherent springiness (compliance) in the drive element applying force between the parts, the drive element will tend to stretch or compress, or wind up, as force is applied to the movable part while the contact surfaces are being held in contact by the static friction force. Once relative motion occurs, this compression, tension, or winding-up of the drive element will cause rapid movement between the parts, to release the energy stored in compression, tension or wind-up of the drive element. Once the stored energy is released, however, through rapid relative movement between the parts, the relative velocity between the contact surfaces will drop to the point that the static friction force will once again cause the parts to stick to one another, and thereby preclude further relative motion, until sufficient compression, tension, or wind-up of the drive element once again occurs, to overcome the static frictional force and cause slipping of the contact surfaces relative to one another.

Stick-slip behavior is sometimes encountered in machinery used in pumping fluids, such as gas, water, or oil, out of the ground. In such applications, long shafts, having lengths of hundreds or thousands of feet, may connect a pumping apparatus located far below ground level to a shaft drive mechanism located above ground level. Such long shafts have considerable inherent springiness, both axially and radially. This considerable springiness allows a significant amount of energy to be stored in the shaft, if the underground components stick to one another, such that when the torsional force due to wind-up of the shaft becomes high enough to cause the underground parts to break free from one another, they will slip relative to one another at a very high rotational speed, until the energy stored in the shaft is dissipated.

In one model description, a tool string can be regarded as a torsional pendulum wherein the top of the tool string rotates with a substantially constant angular velocity, whereas the downhole element performs a rotation with varying angular velocity. The varying angular velocity can have a constant part and a superimposed torsional vibration part. In extreme cases, the downhole element periodically comes to a complete standstill. Maintaining rotation of the tool string at surface builds up torque and eventually causes the downhole element to come loose and to suddenly rotate again, typically leading to a momentary downhole angular velocity being much higher than the angular velocity at surface. This high angular velocity is typically more than twice the speed (factors of 4 to 5 have been observed) of the nominal speed of the drive system at surface. Thereafter the downhole angular velocity slows down and returns to zero again where after the process is repeated, causing an oscillating behaviour of the downhole end of the drill string. This phenomenon is known as stick-slip.

It is desirable to reduce or prevent these vibrations in order to reduce one or more shock loads to the equipment, avoid reverse rotation, avoid excessive wear, avoid damage to sensitive well tubulars, and avoid premature tool failures. High peak speeds occurring during the slip phase can lead to secondary effects like extreme axial and lateral accelerations and forces. Proper handling of downhole vibrations can significantly increase reliability and performance of the equipment.

To suppress the stick-slip phenomenon, control methods and systems have been applied in the art to control the speed of the drive system at surface such that the rotational speed variations of the downhole end of the tool string are reduced or prevented.

U.S. Pat. No. 7,645,124-B2 discloses a method to control a downhole pump system exhibiting stick-slip behavior and having unmeasurable states. The method uses a model of the downhole pump system, the model including reference states of the unmeasurable downhole states. The method includes the step of estimating the unmeasurable states and regulating the system to minimize differences between the reference states and the estimates. The unmeasurable states include a pump angle estimate and a pump speed estimate.

The article "Torque Feedback Used to Cure Slip-Stick Motion" by Halsey et al., 1988, SPE 18049, approaches the problem from yet another angle. A drill string can be regarded as a transmission line for torsional waves. A variation of the friction torque at the bit or elsewhere along the drill string generates a torsional wave that propagates upwards or downwards along the drill string and is partially reflected at geometric discontinuities. When the transmitted wave reaches the drive system, it is partially reflected back into the drill string. For a drive system with a high inertia and/or a stiff speed controller the reflection is nearly total so that very little wave energy is absorbed by the drive system.

To quantify the top drive induced absorption of wave energy, SPE 18049 defines a complex and unitless reflection coefficient r for torsional waves at the interface between the tool string and the drive system as follows:

$$r = \frac{\zeta - Z}{\zeta + Z} \quad (1)$$

where $\zeta$ is the characteristic impedance of the tool string for torsional waves, having unit [(Nm*s)/rad] and Z is the impedance of the drive system (in the article this is a rotary table), having unit [(Nm*s)/rad].

Please note the definition of mechanical impedance in formula (1) as torque divided by speed. This in contrast to the reverse definition of mechanical impedance as speed divided by torque with units [rad/(Nm*s)] used by default in the description of the present invention (unless referring to SPE 18049).

Formula (1) is general and applies to all kinds of transmission lines. For instance, note the comparison to impedance matching between components in electrical engineering to prevent reflections. The reflection coefficient r is a complex function where, in general, both the magnitude and phase vary with frequency. If the speed control of the drive system is stiff (i.e. drive output impedance |Z|>>tool string characteristic impedance $\zeta$), both in units [(Nm*s)/rad], then the reflection coefficient r approaches −1 and substantially 100% of the torsional wave energy is reflected back down the drill string at the drive system. The value of r can also reach +1 if the drive is tuned as a stiff torque controller (i.e. drive output impedance |Z|<<tool string characteristic impedance $\zeta$). Still, substantially 100% of wave energy would be reflected at such drives. On the other extreme, if the speed control of the drive system can make the impedance of the drive system match the impedance of the tool string (i.e. Z≈$\zeta$), then the reflection coefficient r approaches 0, and ideally 100% of the torsional wave energy will be absorbed in the drive system. The latter would imply that substantially 0% of the wave energy will be reflected back into the tool string where such energy might otherwise accumulate and increase the amplitude of vibrations.

SPE 18049 proposes to mitigate stick-slip vibrations by torque feedback. The rotary speed demanded from the drive system (i.e. the set rotary speed) is adjusted in response to variations in the torque level. A measured torque T is multiplied by the drill string impedance $\zeta$, which is to be subtracted from the set speed of the drive system. A speed correction factor $\Omega_1$, having unit [rad/s], is proportional to minus the measured torque:

$$\Omega_1 = -HT \cong -\frac{T}{Z} \quad (2)$$

where H is the torque feedback constant, with unit [rad/(Nm*s)]. The correction allows the drive system speed to respond to dynamic torque oscillations in such a way that the drive system absorbs or dampens the vibrations. The demanded speed is adjusted in response to variations in the torque level. When a positive torsional wave travelling up the drill string meets the drive system, the measured torque increases and the rotary speed adjusts slightly. Normally, a control system would react to the speed dropping below the demanded speed by adjusting the drive torque output. As pointed out above, this process would reflect most of the torsional energy back down the tool string. This reaction is softened by decreasing the demanded speed in response to an increase in torque.

In the torque feedback system of SPE 18049, however, the effective impedance Z, having unit [(Nm*s)/rad], with torque feedback is:

$$Z = \frac{Z_c + i\omega J}{1 + HZ_c} \quad (3)$$

where $$Z_c = R + \frac{S}{i\omega}$$

represents the part of the impedance determined by the speed controller electronics and where $\omega$ represents frequency. I.e., $\omega$ represents frequency F of the torsional waves. The part of formula (3) related to the rotational inertia J of the drive system, having unit [kg*m²], renders the feedback system of SPE 18049 dependent on frequency $\omega$ (or F) of the torsional waves. In consequence, it is impossible to match the drive system impedance Z to the impedance $\zeta$ of the drill string for all frequencies. No matter how the speed control electronics tune the impedance part $Z_c$, it is impossible to eliminate wave reflections for all frequencies of the torsional waves due to the frequency dependent component related to the inertia J and/or stiffness S of the drive system.

This is confirmed in attached FIGS. 1 and 2, which are derived from FIGS. 1 and 2 of SPE 18049 respectively.

FIG. 1 shows the amplitude of the reflection coefficient r versus frequency F in Hertz for various settings 100, 102, 104, 106 of the system of SPE 18049. At or near the frequency of the first resonance mode of the tool string, the system can substantially achieve between 10 to 80% reduction of the reflection of a torsional wave having said frequency. However, for all higher resonance modes, i.e. torsional waves having a higher frequency such as harmonics, the reflection coefficient is significantly higher, i.e. closer to 1, corresponding to considerably less damping.

Waveguide systems may be have either closed/closed, open/open or open/closed opposite ends. If only one frequency, i.e. only one wavelength, is being targeted in any given waveguide system, then higher order frequencies (overtones, harmonics) will still grow, in particular in the absence of standing wave growth at the fundamental frequency. These overtones will be ⅓, ⅕, ⅐, ⅑ etc. times the fundamental wavelength for an open/closed system. They will be ½, ⅓, ¼, ⅕ etc. times the fundamental wavelength for a open/open, or for a closed/closed system.

FIG. 2 shows the rotary torque T versus frequency F with (line 122) torque feedback system and without (line 120). F relates to the frequency of torsional waves. The feedback-system of SPE 18049 is able to achieve a four-fold reduction of the rotary torque at the frequency of the lowest mode. The corresponding reduction of reflections at higher modes, however, is much smaller.

In the system disclosed in SPE 18049, the objective of minimizing the reflection coefficient can only be met partly, and only at one particular frequency. Rather than neutralising the top drive inertia J, the authors actually use the inertia together with speed controller stiffness S, to tune the system towards a particular frequency. As disclosed in SPE 18049, the reflection coefficient has a minimum for the frequency, i.e. for a torsional wave having said frequency, making the top impedance Z purely real (halfway page 3 right column), i.e. $2*\pi*f=\sqrt{(S/J)}$.

From formula (7) it can be seen what would happen if Zc would be brought to infinite. In that case, Z=1/H, which is the desired zero reflections property. If Zc were brought close to infinite, the resistance R (or stiffness S) of the drive system is brought to infinite, and S (or R) becomes irrelevant. One can thus no longer tune to a desired frequency by tuning the value of S.

The objective for the system and method disclosed in SPE 18049 is to (only slightly) lower the wave reflection coefficient at the interface between drillstring-to-topdrive. As indicated by formula (3), the authors assume a given basic speed controller (such as a proportional-integral controller or PI controller) with sub-optimal P and I gains (indicated by R and S, also known as damping Cf and stiffness Kf in later publications). Then the authors explain what would happen, which reflection coefficients would be realised by a top drive in combination with such a sub-optimal speed controller. The above indicates the constraints of the controller architecture, which has only the parameters R, S and H as variables. SPE 18049 links the value for S (Kf) to the value of drive system inertia J to tune the system towards a selected drill string eigenfrequency. In other words, the system disclosed in SPE 18049 is tuned towards an observed or predicted tool string eigenfrequency (or fundamental wavelength).

Consequently, implementations based on the method of SPE 18049 (such as U.S. Pat. No. 5,117,926 and EP-2364397-B1) all require some type of tuning towards the most problematic stick-slip frequency, usually the lowest tool string mode, also known as fundamental string frequency. Said frequency may be either observed, e.g. as the period of stick-slip oscillations during drilling, or it can be predicted from the material and dimensions of the tool string and downhole components.

EP-2364397-B1 discloses a method and system for mitigating stick-slip oscillations, wherein the rotational speed is controlled using a PI controller that, when considered together with drive rotational inertia J, is tuned to a selected stick-slip frequency, so that the drive system absorbs torsional oscillations at or near said selected frequency.

In the system and method of EP-2364397-B1, the I-term of the PI controller is adjusted according to $I=\omega_s^2 J$ with units [Nm/rad], where $\omega_s$ is an approximate or estimated angular frequency of said stick-slip oscillations and J is the effective inertia of the drive system. Disadvantages thereof include the limitation to the selected frequency. Waves at other frequencies, including harmonics of the selected stick-slip frequency, will still be partly reflected, thereby possibly increasing in amplitude and evolving into standing waves reflected at both ends of the drill string. But most importantly, as the reflection coefficient provided by the system of EP-2364397-B1 will always be greater than 0, standing waves can still emerge, although it may take longer before the resonance has reached enough amplitude for the bit speed to approach zero, at which point it stalls (sticks), and needs substantially more torque before it will start to rotate again in a shock.

The prior art methods referenced above all provide some improvement in the stick-slip free operating envelope of the system.

The present invention aims to provide an improved method and system for mitigating vibrations.

The invention therefore provides a method of damping vibrations in a tool string, said vibrations comprising torsional waves propagating along said tool string, the method comprising the steps of:
  instructing a drive system to rotate the tool string at a set rotational speed;
  determining a rotational speed of the tool string;
  determining a torque at or near the interface between the tool string and the drive system;
  determining a tool string impedance of a tool string section adjacent said interface;
  calculating a rotation correction signal using the determined torque multiplied by the determined tool string impedance;
  correcting the set rotational speed using the rotation correction signal to provide a corrected set rotational speed signal;
  subtracting the measured rotational speed from the corrected set rotational speed signal to provide a twice corrected set rotational speed signal to the drive system.

In an embodiment, the tool string drives a pump device.

The method of the invention comprises a first correction signal, which matches the impedance of the drive system to the impedance of the tool string connected to the drive system. The correction signal adjusts the impedance of the drive system as observed by a wave propagating along the tool string towards the drive system. The method combines the impedance correction signal with a second control signal to tune the rotational speed of the tool string to the rotational speed as set by the impedance matched correction signal. The latter feedback loop urges the drive system to accurately follow the impedance matched control signal, which in effect ensures that the drive system inertia, as observed by the wave propagating along the tool string towards the drive system, approaches zero. Thus, the effective impedance Z can be made frequency independent.

As a result, the wave will be absorbed for all frequencies, in line with active impedance matching theory as commonly applied in telecommunications transmission line electronic drive circuitry. In practice, for all frequencies herein may imply all frequencies within a selected frequency band. The selected frequency band for instance comprises a plurality of reflection modes, also known as harmonics or overtones.

In an embodiment, the method may be set to function within a range of envisaged stick-slip frequencies.

In another embodiment, the method includes steps for automatic tuning the determined tool string impedance. The embodiment obviates the need for re-tuning the system every time a section of tool pipe or rod with different characteristics (different relative to a previously used pipe or rod) is added to the tool string and connected to the driving element.

The method can eliminate the first mode as well as higher modes of oscillation. The method is robust and handles any waves resulting from changes in the interaction between, for example, the rock formation and the drill bit (frictional changes, damping changes, etc), step changes in the rotational speed of the drive system, step changes in bit torque, etc.

In an embodiment, the method may include the step of adding or subtracting a third corrective speed signal to or from the twice corrected set rotational speed signal. This ensures that, at timescales much longer than the longest expected stick-slip period, the drill string rotational speed is eventually adjusted to the desired set point speed.

According to another aspect, the invention provides a control system for damping vibrations in a tool string, said vibrations comprising torsional waves propagating along said tool string, the system comprising:
  a user control module for instructing a drive system to rotate the tool string at a set rotational speed;
  a sensor for determining a rotational speed of the tool string;
  a torque sensor for determining a torque at the interface between the tool string and the drive system;
  a processing unit for determining a tool string impedance of a section of the tool string adjacent said interface;
  a first feedback loop comprising means for multiplying the torque by an impedance gain factor, which impedance gain value is set to correspond to a tool string impedance, for providing a rotation correction signal, and for correcting the set rotational speed using the rotation correction signal to provide a corrected set rotational speed signal;
  a second feedback loop for subtracting the determined rotational speed from the corrected set rotational speed signal to provide a twice corrected set rotational speed signal to the drive system.

In an embodiment, the system comprises a pump device drivable by the tool string.

Herein, please note the reversed definition of mechanical impedance using speed divided by torque. I.e., by default the description of the present invention will use a reverse definition of mechanical impedance, wherein mechanical impedance is defined as speed divided by torque, having unit [rad/(Nm*s)].

In an embodiment, the system includes a third feedback loop. The third feedback loop ensures that, at timescales much longer than the longest expected stick-slip period, the tool string rotational speed is adjusted to the desired set point speed, irrespective of the static torque that needs to be supplied by the drive.

The invention will be described hereinafter in more detail by way of example, with reference to the drawings, in which.

In the description, like reference numerals relate to like components.

Figure 3:
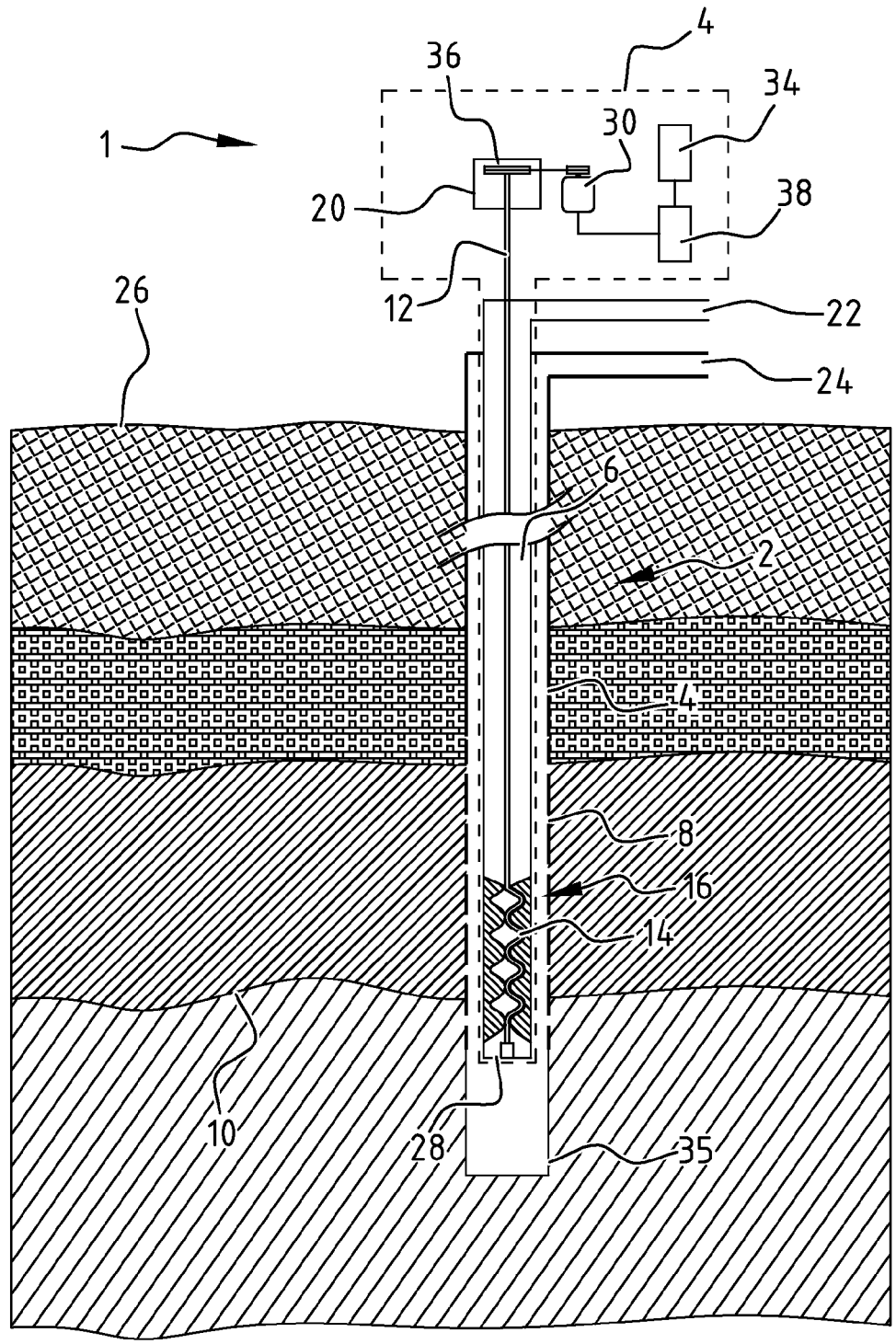
FIG. 3 shows a downhole pump system to be controlled by the method and control system of the invention.

FIG. 3 shows an exemplary embodiment of a downhole pump system 1 in which the present invention may operate. The downhole pump system shall be described with reference to a wellbore 2 wherein oil is to be separated from an underground gas formation 10. The wellbore 2 may include an outer casing 4 and an inner tube 6 that extend from surface 26 to, for instance, as much as 1000 feet or more below ground level. The casing 4 typically has perforations 8 to allow the fluid in the underground formation to enter the wellbore. Herein, water and gas can be combined with oil and the pump can be used for other liquids. The control apparatus described herein can also be used for other liquids, for instance for water only. The bottom of the tube 6 generally terminates below the underground formation 10, at downhole end 35.

A pump 16, for instance a progressing cavity pump (PCP), is mounted at the lower end of the tube 6. The pump may include a helix type of pump member 14 mounted inside a pump housing. The pump member 14 is attached to and driven by a pump rod string 12 which extends upwardly through the tube and is rotatable by a drive motor 30 in a conventional well head assembly 20 above ground level. The tube 6 may be provided with a liquid outlet 22 and the casing 4 may have a gas outlet 24 at the upper end above ground level 26. These elements are shown schematically in FIG. 3. The construction and operation of the progressing cavity pump is conventional. An optional check valve 28 may be located either on the suction side, as shown, or the discharge side of the pump 16 to reduce back flow of fluid when the pump is off.

The operation of the pump 16 is controlled by a pump control system 4. The pump control system includes a vibration mitigation method and system in accordance with the present invention. For purposes of illustration, the pump control system 4 is described with reference to an application in a pump system that includes a conventional progressing cavity pump.

The progressing cavity pump 16 may be coupled to an electric drive system of the pump control system 4. The pump control system 4 comprises a user control unit 34 and a logic controller 38. The logic controller is coupled to a motor 30 for rotating the rod string 12. The rod string 12 includes helix portion 14 of the pump 16. The rod string 12 is suspended from the well head assembly 20 for rotating the helix 14 that is disposed near the bottom 35 of the wellbore.

The motor for driving the tool string 116 may include an electric motor 30. Optionally, a shaft of the motor 30 can be coupled to the rod string 12 through a gearbox 36 or similar speed reduction mechanism. Alternatively, the motor may be controlled by a variable frequency drive system (See for instance FIG. 5).

The motor 30 can be a three-phase AC induction motor designed to be operated from line voltages in the range of 230 VAC to 690 VAC and developing 5 to 250 horsepower, depending upon the capacity and depth of the pump. The gearbox 36 may convert motor torque and speed input to a suitable torque and speed output for driving the rod string 12 and helix 14.

In use, the tool string 12 together with the helix 14 of the pump 16 is rotated by the drive system 30.

The system typically includes a user control unit 34. Data and information may be displayed on a screen 36 of the control unit 34. The control unit may typically include a user input device such as a keyboard (not shown) for controlling at least part of the process. A logic controller 38 sends and receives data to and from the console 34 and the drive system 30. In particular, an operator may be able to set a speed command and a torque limit for the drive system to control the speed at which the tool string 12 rotates.

Figure 4:
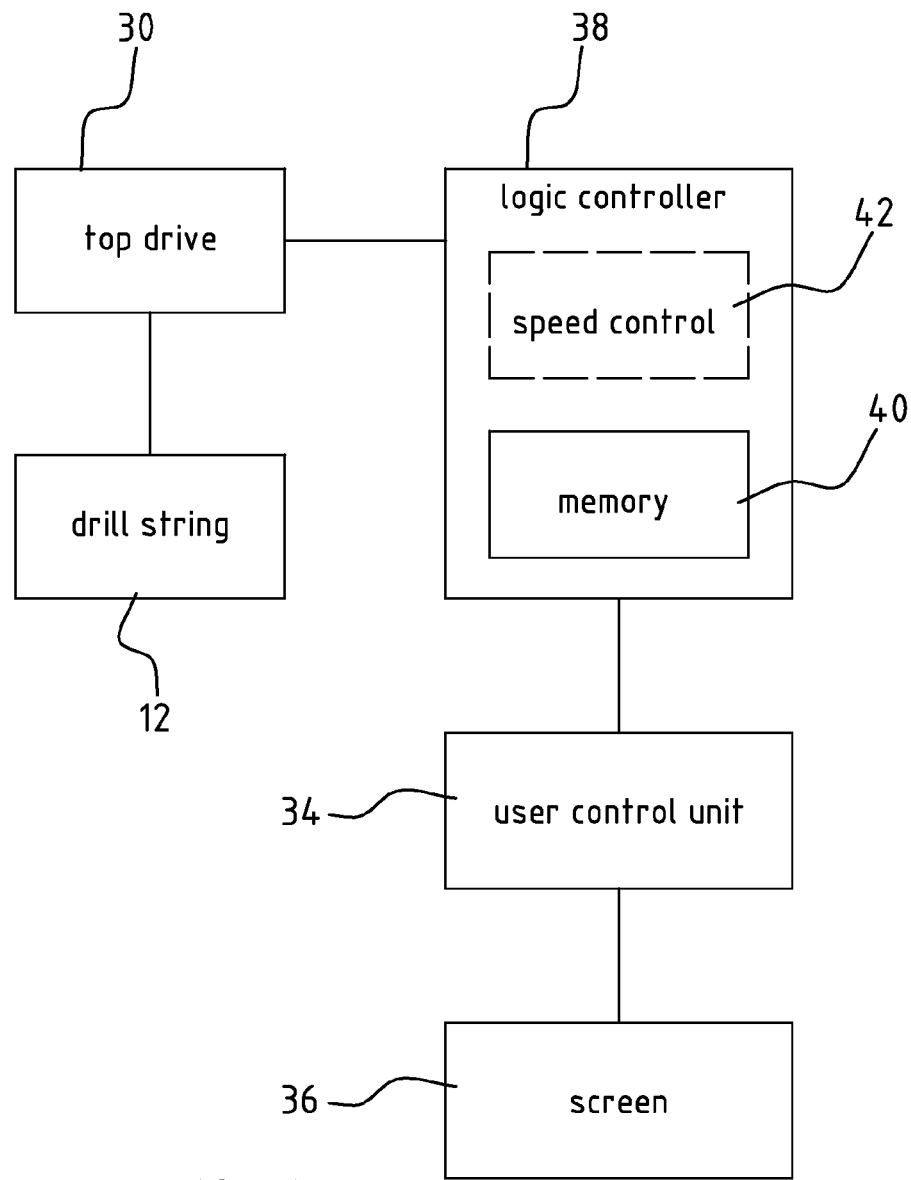
FIG. 4 shows a schematic setup of the pump system including a control system of the invention.

As shown in FIG. 4, the controller 38 may comprise a memory unit 40, such as a battery backed-up RAM or flash memory. The memory may store computer executable instructions that, when executed, perform the function of a speed controller 42 for the motor 30. Alternatively, part or all of said executable instructions may be implemented in hardware. In the embodiment shown in FIG. 4, the speed controller 42 is separate and distinct from the drive system 30. However, it is possible for the functionality of the speed controller to be provided as part of a built-in dedicated speed controller of a motor or similar drive system.

It is to be understood that the system and method of the invention may be implemented into other control systems or as a separate component. The pump control system 4 controls the operation of the pump 16. The pump control system 4 may include transducers, such as motor current and motor voltage sensors, to sense dynamic variables associated with motor torque and velocity. Current sensors may be coupled to a sufficient number of the motor windings, for instance two in the case of a three phase AC motor. Voltage sensors may be connected across the motor winding inputs. The motor current and voltage signals produced by these sensors may be supplied to a processing unit 38 of the controller 4 through suitable input/output devices. The storage unit 40 may have memory that is volatile (such as RAM), non-volatile (such as ROM, flash memory, etc.) or some combination of the two.

Figure 5:
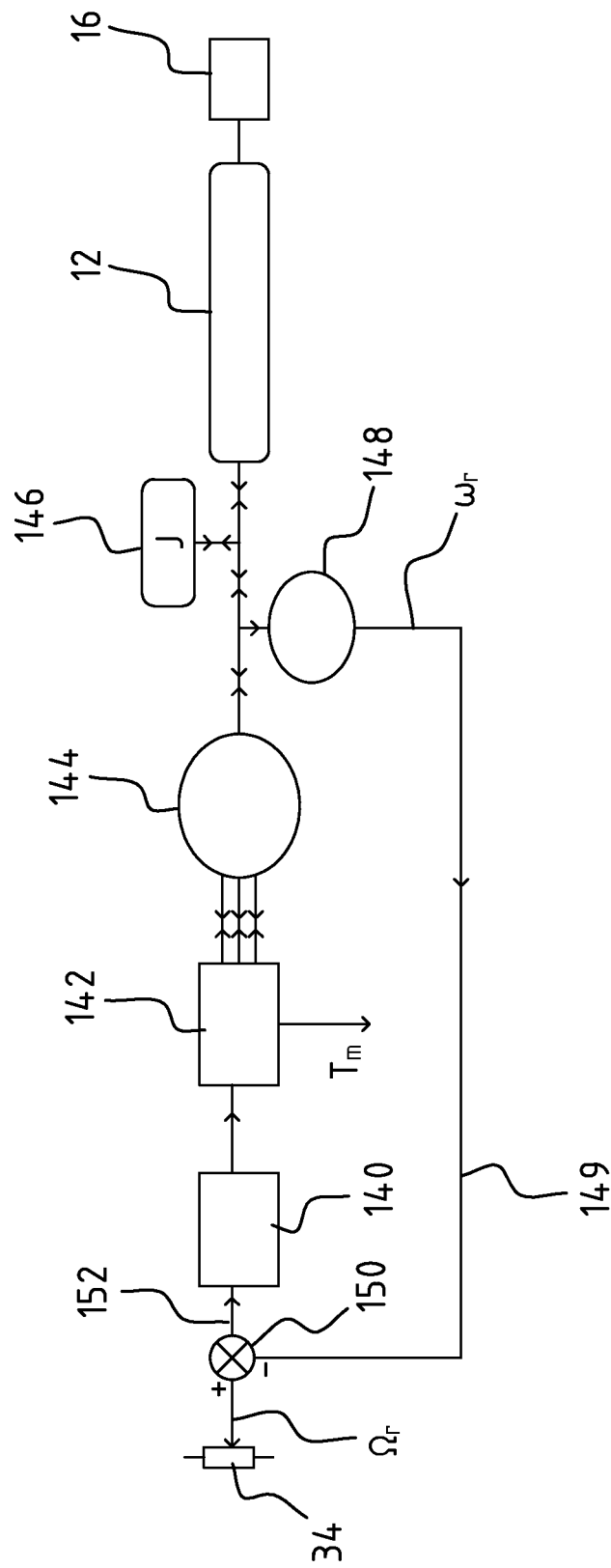
FIG. 5 shows a prior art control system.

FIG. 5 shows a schematic representation of a prior art system, which is for instance suitable for implementing a torque feedback system as disclosed in SPE 18049. User control unit 34 is connected to a so-called proportional and integral (PI) controller 140. The PI controller is connected to a motor management system 142, for instance a variable frequency drive (VFD) unit, which controls motor 144. The motor 144 is connected to an uphole end of the tool string 12, which is provided with equipment at the opposite downhole end. A rotational inertia J of the drive system is schematically represented by inertia block 146 at the interface between the tool string 12 and the drive system. Herein, J is the rotational inertia that constitutes a substantial part of the drive impedance. The drive impedance is the impedance that is encountered by a wave propagating via the drill string and arriving at the interface between the drive system and the drill string. A sensor 148 detects rotational speed $\omega_r$ (for instance in rotations per minute (RPM) or rad per second). The motor management unit 142 is able to monitor motor torque Tm. Said motor torque Tm may for instance be made available to an operator via the user interface of control unit 34.

In use, the sensor 148 provides the measured rotational speed $\omega_r$, for instance having unit [rad/s], to an input of sum element 150, which subtracts the measured rotational speed $\omega_r$ from the set rotational speed $\Omega_r$, for instance having unit [rad/s], as set by the operator. The output 152 of the sum element 150, comprising the differential rotational speed $\Omega_{dif}$, is provided to the PI controller 140. I.e., the sum element will provide an input signal to the PI controller when the rotational speed of the drill string differs from the set rotation speed.

As described above, the unit of $\omega_r$, as provided by sensor 148, is an angular speed in rad/s. If measured in RPM then said angular speed may be multiplied by $2*\pi/60$ to get rad/s. Subsequently it can be used as described in the control and flow diagrams of the respective Figures and the corresponding description.

Embodiments of the system according to the invention will be described below. Features and components which have been described before will have the same reference numbers and will not be described again.

Figure 6:
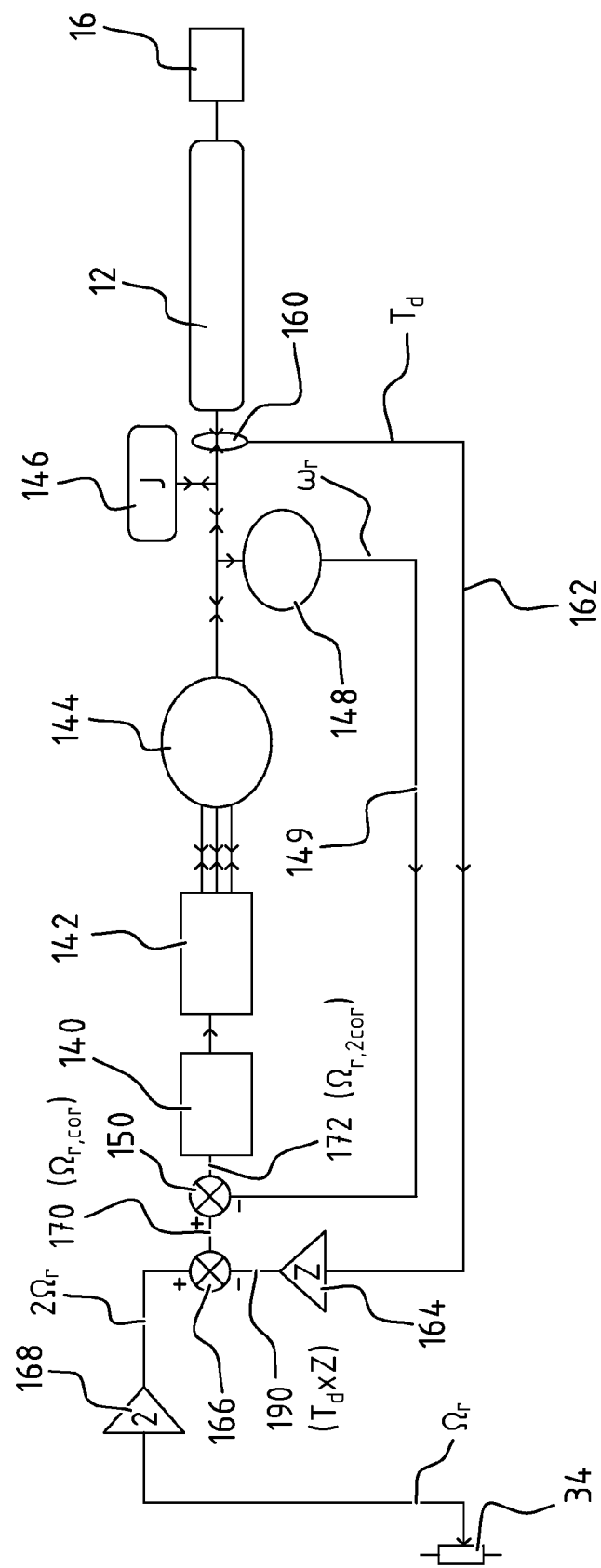
FIGS. 6 to 11 show embodiments of a control system of the invention.

FIG. 6 shows an embodiment for a feedback system according to the invention. Torque sensor 160 measures torque $T_d$, having unit [Nm], delivered to the tool string 12. The sensor 160 is preferably located at or near the interface between the motor 144 and the uphole end of the tool string. The output 162 of the torque sensor, providing measured torque $T_d$, is coupled to the input of amplifier 164. The amplifier 164 may amplify the input signal by a predetermined gain, for instance z'. Herein, z' may be set to correspond to $\zeta$, which is the characteristic tool string impedance (unit [rad/(Nm*s)]). The relevant tool string impedance herein is the impedance of the top section of the tool string, i.e. the section which is connected to the drive system.

The torsional impedance of the tool string is a frequency independent value, which can be calculated. For instance using the formula:

$$\zeta = \frac{1}{\frac{1}{32}*\pi*(OD^4 - ID^4)*\sqrt{G*\rho}} \tag{4}$$

($\zeta$ in unit [rad/(Nm*s)]), with inner diameter ID and outer diameter OD, shear modulus G and density $\rho$ of the material of the tool string. Formula (4) is valid for a tool string including an inner fluid channel having diameter 2*ID, as well as for a solid tool string. For a solid tool string, ID=0.

Thus, the output of amplifier 164 forms a speed correction signal 190, with unit [rad/s], which is provided to sum element 166.

Set rotational speed $\Omega_r$, as set by the operator via user control unit 34, is provided to gain module 168, and multiplied by a gain factor G. Said gain factor is for instance 2. The amplified set rotational speed $G*\Omega_r$ is provided to another input of sum element 166. The sum element 166 subtracts the calculated speed correction signal 190 from the amplified set rotational speed, and provides the corrected set rotational speed $\Omega_{r,cor}$ to an input 170 of sum element 150. Herein:

$$\Omega_{r,cor} = 2*\Omega_r - T_d*z' \tag{5}$$

The units of $\Omega_r$ and $\Omega_{r,cor}$ are in [rad/s]. The unit of z' is [(rad/s)/N*m]=[rad/(Nm*s)]. The unit of torque is [N*m].

The sum element 150 subsequently subtracts the measured rotational speed $\omega_r$, as provided by the sensor 148, from the corrected set rotational speed $\Omega_{r,cor}$, to provide a twice corrected rotational speed $\Omega_{r,2cor}$ [rad/s]:

$$\Omega_{r,2cor} = \Omega_{r,cor} - \omega_r = 2*\Omega_r - T_d*z' - \omega_r \quad (6)$$

The sum element 150 provides the twice corrected rotational speed $\Omega_{r,2cor}$ to the PI controller 140, indicated by signal 172.

The objective of the controller is to bring the twice corrected rotational speed $\Omega_{r,2cor}$ to zero, so that formula (6) provides:

$$\Omega_{r,2cor} = 2*\Omega_r - T_d*z' - \omega_r = 0 \quad (7)$$

or $$z' = \frac{(2*\Omega_r - \omega_r)}{T_d}$$

Formula (7) does not include a component which depends on the frequency of torsional waves. Formula (7) lacks a frequency dependent component, and z' is a purely real and frequency independent value. Purely real herein means that z' lacks a complex part. Also, please note that $\omega_r$ in formula (7) relates to the (measured) rotational speed of the tool string. This is contrary to formula (3) above, which is derived from SPE 18049 and uses the symbol ω to represent frequency of a torsional wave.

As a result, the system of the invention enables the damping of all vibrational modes, for instance over a selected frequency range, using gain value z' in a feedback loop, wherein z' is a real and frequency independent value. Said frequency range relates to frequencies of the torsional waves. The frequency range may include the fundamental torsional wave frequency and any predetermined number of harmonics thereof.

The PI controller may function as a typical stiff PI controller, obviating the need to tune the controller 140 to any specific (resonance) frequency. Said PI controller may be simplified further to a more basic P-only controller, with its value P set as high as possible, limited only by dead time and sensor/actuator phase errors within the control loop. The remainder of the system functions as described before.

Referring to formula (3) above, in the system of the invention, the controller gain Zc may be set as high as possible without loosing controller loop stability, and then dampen any torsional vibrations.

In a practical embodiment, the speed controller 140 is a stiff speed controller. Stiff controller herein implies that the speed controller 140 has a gain set at relatively (very) high values. The gain is preferably set at infinite. In practice, the gain may be in the order of 10,000 Nms/rad or (much) more. The gain may be set at, for instance, 15,000 Nms/rad, 20,000 Nms/rad, 50,000 Nms/rad, or more.

Gain of the speed controller herein refers to one or more of the proportional, integral and/or derivative terms of a PID controller. The PID control scheme is named after its three correcting terms, whose sum constitutes the manipulated variable (MV). The proportional, integral, and derivative terms are summed to calculate the output of the PID controller. The system of the invention may include a PI controller, which lacks the derivative term. Defining u(t) as the controller output, the final form of the PID algorithm is:

$$u(t) = MV(t) = K_p e(t) + K_i \int_0^t e(\tau)d(\tau) + K_d \frac{d}{dt}e(t)$$

wherein $K_p$ is Proportional gain, $K_i$ is Integral gain, $K_d$ is Derivative gain, e is an Error, t is Time or instantaneous time (the present), τ is a Variable of integration, which takes on values from time 0 to the present t.

The proportional term produces an output value that is proportional to the current error value. The proportional response can be adjusted by multiplying the error by a constant $K_p$, called the proportional gain constant.

A high proportional gain results in a large change in the output for a given change in the error. If the proportional gain is too high, the system can become unstable (see the section on loop tuning). In contrast, a small gain results in a small output response to a large input error, and a less responsive or less sensitive controller. If the proportional gain is too low, the control action may be too small when responding to system disturbances. Tuning theory and industrial practice indicate that the proportional term should contribute the bulk of the output change.

The contribution from the integral term is proportional to both the magnitude of the error and the duration of the error. The integral in a PID controller is the sum of the instantaneous error over time and gives the accumulated offset that should have been corrected previously. The accumulated error is then multiplied by the integral gain ($K_i$) and added to the controller output.

The integral term accelerates the movement of the process towards setpoint and eliminates the residual steady-state error that occurs with a pure proportional controller. However, since the integral term responds to accumulated errors from the past, it can cause the present value to overshoot the setpoint value.

The derivative of the process error is calculated by determining the slope of the error over time and multiplying this rate of change by the derivative gain Kd. The magnitude of the contribution of the derivative term to the overall control action is termed the derivative gain, $K_d$.

According to the invention, the gain of the speed controller 140 may be set relatively high, providing a relatively stiff speed controller. Gain herein may include one or more of the Proportional gain ($K_p$), the Integral gain ($K_i$), and the derivative gain ($K_d$). Preferably, at least the Proportional gain ($K_p$) is set relatively high. Relatively high herein may indicate 10,000 Nms/rad or more in practice.

Figure 7:
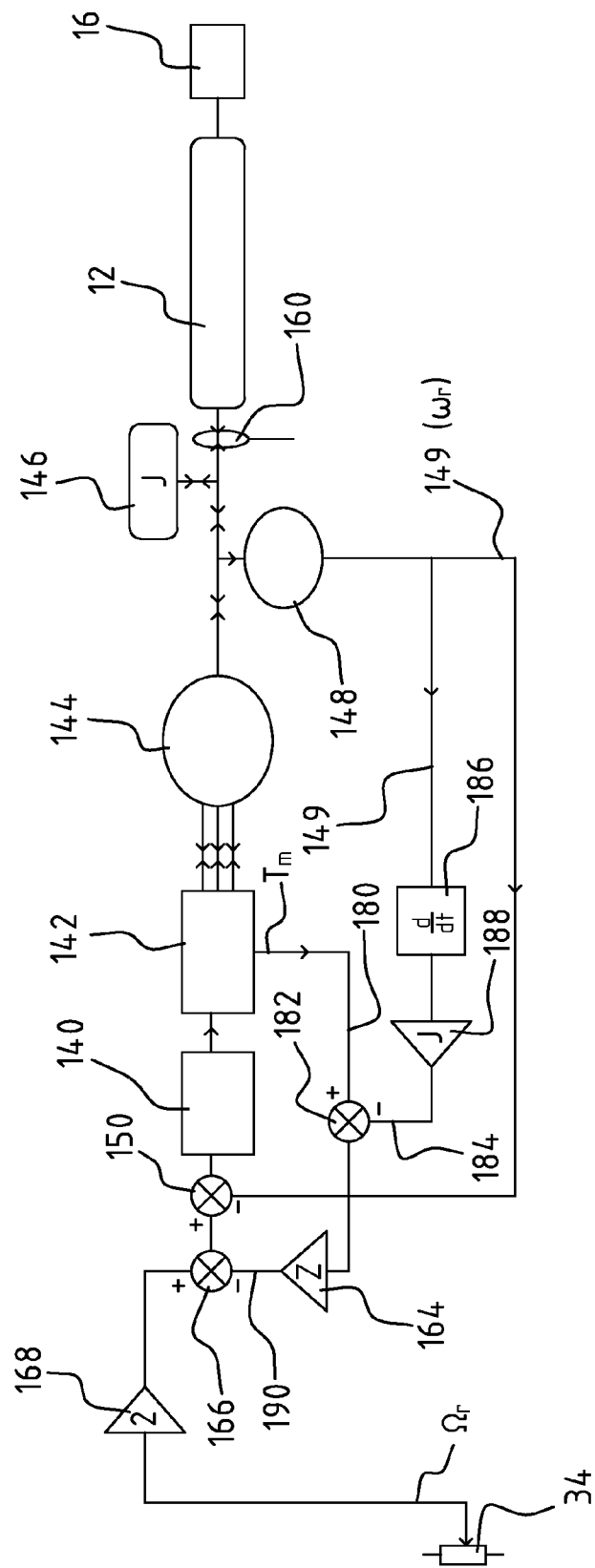

In another embodiment, as shown in FIG. 7, the pipe torque is calculated from the sensed motor torque Tm and the measured speed $\omega_r$. The motor torque Tm from the motor management unit 142 is provided to an input 180 of sum element 182. Another input 184 of said sum element 182 is provided with a speed dependant torque signal $T(\omega_r)$. Said torque signal is the result of the measured rotational speed $\omega_r$ provided to differentiator 186 and to amplifier 188. Said amplifier amplifies the differentiated rotational speed by a gain factor, which may be substantially equal to the rotational inertia J of the drive system:

$$T(\omega_r) = J * \frac{d}{dt}\omega_r \quad (8)$$

Herein, $T(\omega_r)$ [Nm] approximates the torque required to accelerate and decelerate the rotational inertia J of the drive system and $d/dt(\omega_r)$ [rad/s$^2$] is an approximation of said acceleration.

The sum element 182 subtracts the speed dependant torque signal $T(\omega_r)$ from the motor torque Tm:

$$T_{cor} = T_m - T(\omega_r) \quad (9)$$

Herein, $T_{cor}$ is an approximation of the tool string torque Td as shown in FIG. 6.

The corrected torque signal $T_{cor}$ is multiplied by a factor z'. Herein z' is the desired output impedance of the drive system. The output impedance of the drive system would be indicated by z. The value of z' may be set substantially equal to the impedance ζ of the tool string. Using the same procedure as laid out in the embodiment of FIG. 6, this results in the amplified set rotational speed $\Omega_{r,cor}$ which is provided to sum element 150. In formula:

$$\Omega_{r,cor} = 2*\Omega_r - (T_m - T(\omega_r))*z' = 2*\Omega_r - \left(T_m - J*\frac{d}{dt}\omega_r\right)*z' \quad (10)$$

Formula (10) effectively replaces formula (5), which was related to the embodiment of FIG. 6. It is an option to use the commanded motor torque (the signal from 140 to 142), instead of the sensed motor torque Tm.

Figure 8:
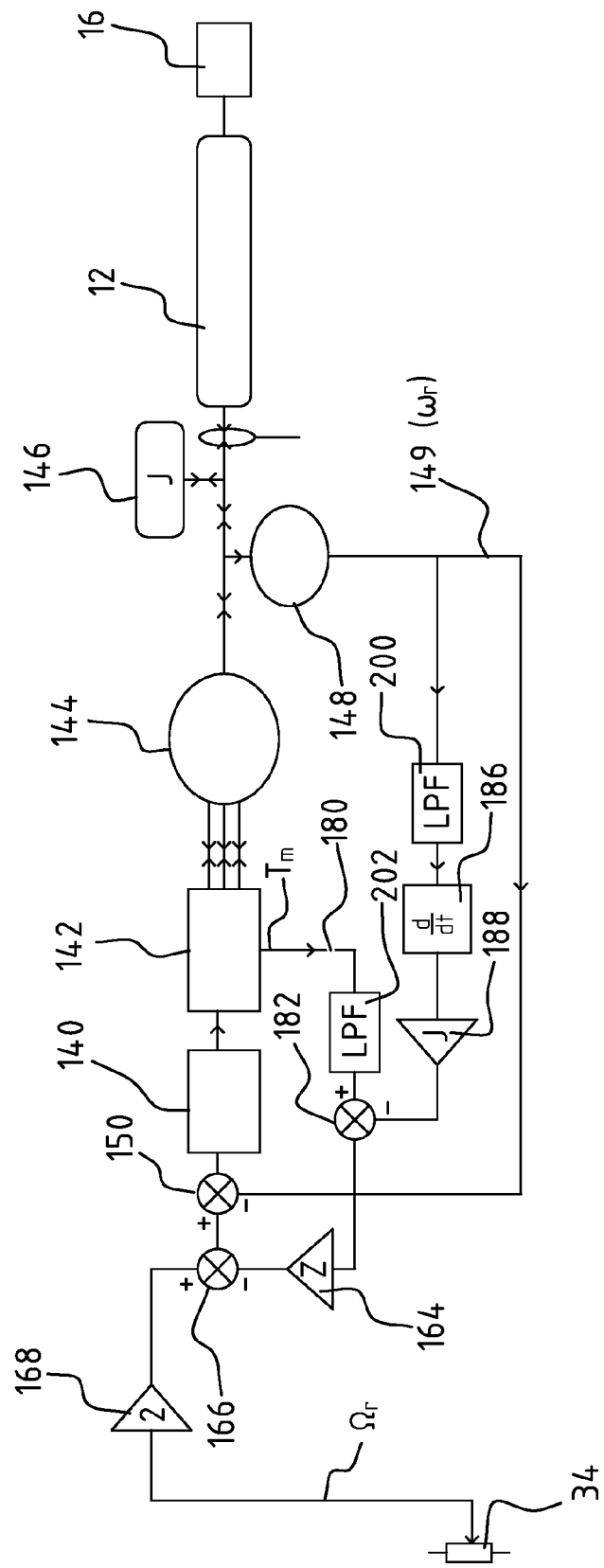

In an improved embodiment, shown in FIG. 8, the rotational speed sensor 148 has a limited bandwidth. The bandwidth is limited to a range having the lowest noise level. To limit noise to propagate through the control system, a low pass filter 200 is provided to the output of speed sensor 148. The motor torque Tm is provided to low pass filter 202. Filter 202 aims to mimic the behaviour of filter 200. Filter 202 also mimics behaviour of low pass filtering and dead time that might exist within the torque actuator (i.e. the motor) to speed sensor signal path, so that subtracting the outputs of filters 200 and 202 later on will not introduce artefacts that may lead to instabilities. The corrections from the rotational speed will be limited to an upper frequency, which will form an upper limit for the primary and multimode stick-slip frequencies to be eliminated. In practice, the low pass filters 200 and 202 may have a cut-off frequency of about 5 Hz.

Likewise, for optimised performance with highest proportional gain P (of the PI controller 140) possible, the intrinsic low pass filtering and dead time in the motor and the motor management system (whether DC or variable frequency AC drive or hydraulic) are preferably mimicked electronically in the torque feedback signal path to summing block 182.

Figure 9:
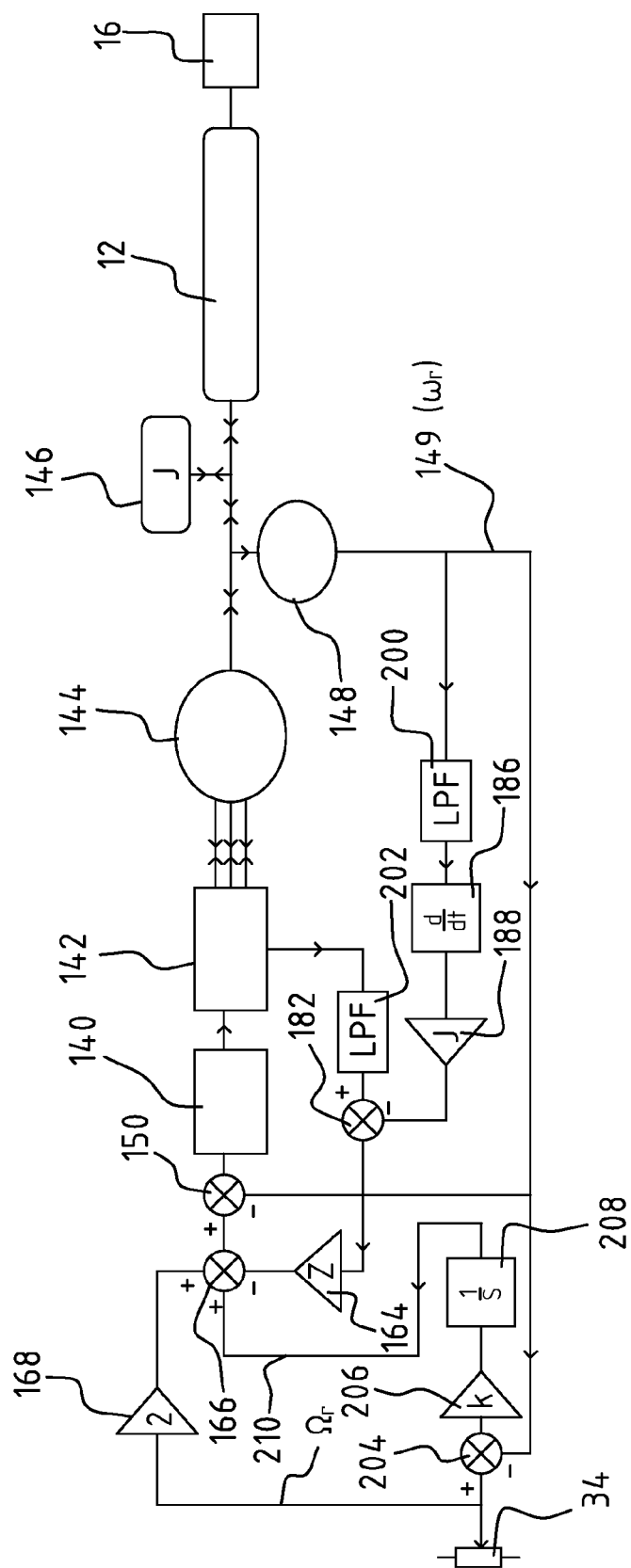

In an improved embodiment, shown in FIG. 9, the system includes sum element 204, amplifier 206 and integrator 208. The embodiment of FIG. 9 has improved ability to hold and control the time averaged tool string speed at the speed $\Omega_r$ as set by the operator under different torque loads. In addition, the embodiment prevents the drive system to stall at relatively low torque levels.

The filtered rotational speed $\omega_r$ is provided to an input of the sum element 204, and subtracted from the set rotational speed $\Omega_r$. The differential rotational speed $\Omega_{r,dif}$ is multiplied by the amplifier 206, for instance by a factor k. Herein, k sets a radial transition frequency [rad/s], indicating (when combined with a given impedance Z) a frequency whereat the system makes a transition from a stiff controller to an impedance matched controller. Optionally, a cut-off frequency k' may be set in [Hz]. Then, the factor k will be k=(2π)*k' [rad/s].

The multiplied differential rotational speed is integrated by integrator 208. The integrator provides any changes in the multiplied differential rotational speed to an additional input 210 of the sum element 166, which adds the latter to the multiplied set rotational speed 2*$\Omega_r$. The assembly of amplifier 206 and integrator 208 functions as a low-pass filter.

Herein, below a set lower threshold frequency determined by k, the system will urge the tool string 12 to follow the set rotational speed exactly regardless of the torque load. In other words it enables the system to achieve a correct setpoint speed, wherein the zero frequency component is excluded from the active impedance matching feedback process.

In a practical embodiment, the transition frequency is in the order of about 0.02 to 0.1 Hz.

Yet another improvement enables the system to automatically determine the correct impedance multiplication factor z' of multiplier block 164 to achieve the aimed impedance matching. Such an automatic adjustment obviates the need for manual entry of tool string characteristics. Automatic adjustment improves accuracy, is more user friendly and less labour intensive. In addition, it will provide more accurate results because changes in tool string diameters, for instance due to lifecycle wear and corrosion, and influences of the complex geometry of tool joints and upsets on tool string impedance ζ are also taken into account.

In view of the above, the validity of generic torsional impedance formulas as often used in literature, such as formula (4) above, may have limitations when applied in practice. The invention allows to automatically set the correct value of z' in block 164 so that at the drive system end of a tool string, torsional waves originating from downhole will not bounce back into the borehole.

One method for automatically matching the drive system impedance z to (top) tool string impedance ζ is to determine the magnitude of impedance mismatch by observing the effect on top drive RPM immediately after a step change in RPM setpoint. Electronic transmission line literature suggests that a perfectly matched source impedance would show a ratio of 50%. With the multiplication of the RPM setpoint set at 2, as shown in the embodiments of FIG. 6 and further, the ratio will be 100%.

Thus, if immediately after a setpoint step, the ratio in observed step amplitudes between surface RPM and setpoint RPM is greater than 1, an initially estimated impedance gain value z' in block 164 will be increased. If said ratio is lower than 1, then impedance gain value z' will be decreased. Thus, without upfront knowledge of connected tool string characteristics the optimum gain value for z' to be programmed in block 164 can be found automatically. The method may use a number of subsequent steps of successive approximation, for example 6 to 10 steps of successive approximation.

This method is immune to scaling errors in both the torque and in the speed sensor paths in as far these signals would need to be calibrated in engineering units. Impedance can be considered 'matched' when rotation speed halves after connecting a load of equal impedance. In the case of tool string, it is preferred that its impedance is sensed immediately after each setpoint step, long before echoes from a connected BHA or open or fixed end have bounced back to the sensors at surface. Because torsional waves may travel at approximately 3 km/s, this would, for example, need to be within 1 second if a 1.5 km long homogeneous tool string were used.

Figure 10:
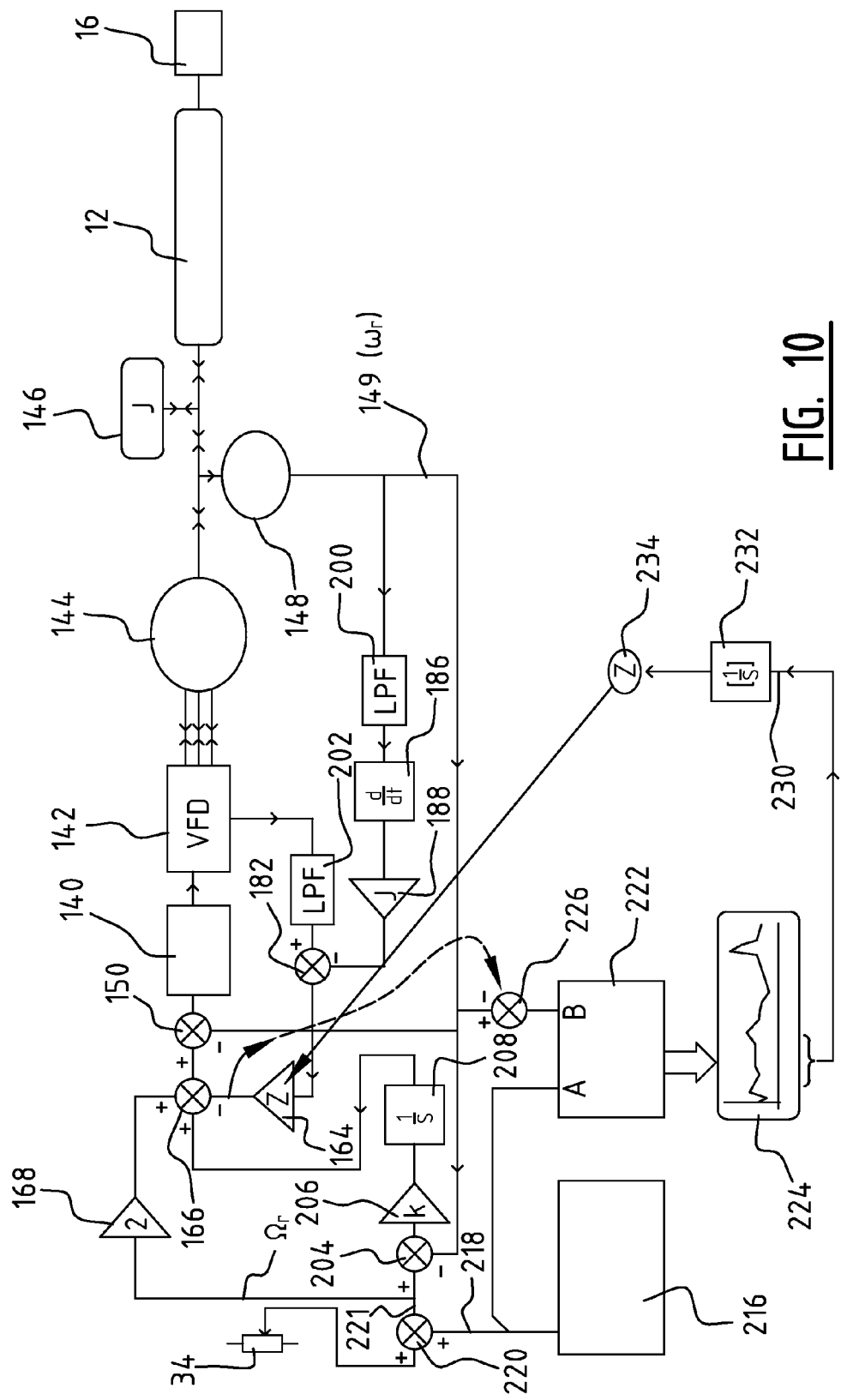

An improved method for automatically matching drive impedance z to (top) tool string impedance ζ is shown in FIG. 10. Using a telecommunication cable diagnostic technique of time domain reflectometry, a spatial image of transmission line impedance changes can be acquired from signals at one end of a long cable. Similarly, an image of a tool string including the coupling to a drive, can be derived from torque and rotational speed signals. These images show a positive peak at the origin (at time t=0 [s]) if the drive system impedance z is less than the load impedance (i.e. the tool string impedance ζ), and a negative peak if the drive system impedance z is higher than the tool string impedance ζ. The peak is absent when the impedance is matched (i.e. z≈z'≈ζ). Therefore, by successively measuring the sign of the peak in time domain reflectometry functions, and adjusting an estimated value for impedance gain value z' of amplifier 164 either up or down, the estimated value z' can be tuned automatically to substantially precisely match the tool string impedance ζ.

White noise generator 216 provides a white noise signal 218 to sum element 220. The white noise signal may have units [rad/s]. The sum element 220 adds the white noise signal 218 to the set rotational speed $\Omega_r$. The signal 221, comprising the sum of the set rotational speed $\Omega_r$ and the white noise, is provided to the amplifier 168 and to the sum element 204.

The same white noise signal 218 is also provided to a first input, marked A, of a cross correlator unit 222. A second input, marked B, of the cross correlator unit 222 is provided with the difference of the measured rotational speed 149 ($\omega_r$) and the output of gain block 164, as provided by sum element 226. The cross correlator unit 222 is adapted to provide a cross-correlation function, from which signal 224 is derived. The multi-channel cross-correlation time signal 224 is for instance provided periodically and may be calculated from:

$$S_{ccf} = IFFT(FFT(A)*CONJ(FFT(B))) \quad (11)$$

wherein FFT means fast fourier transform (an algorithm to compute a discrete Fourier transform (DFT)), IFFT means inverse fast fourier transform, and CONJ means the conjugate operation.

Signal 224 covers the average correlation coefficients in a time window from −t to t, wherein t is chosen such that reflections from the BHA are excluded because these can be assumed too far away in the spatial domain and thus also in the time domain. Torsional waves in tool string may travel at approximately 3 km/s, so that t would, for example, need to be well below 1 second if a 1.5 km long homogenous tool string were used.

Signal 224 contains only information on the part of the tool string image that belongs to the drive system and to the first few hundred meters near the uphole end of the tool string. Heavy weight tool string pipe, and optional other components such as drill collars, bit, and helical blade 14, are thus invisible in signal 224 (channels −t to t), but the impedance change from drive system to tool string is visible. Signal 224 shows a positive value if the drive impedance z is less than the source impedance, and a negative value if the drive impedance is higher. The value is zero when the impedance is perfectly matched. Signal 224 can thus be used to feed an integrator 232. The output 234 of said integrator 232 automatically tunes to and then holds the optimum value for z in block 164. Said cross correlation signal 224, may optionally be presented on a driller console graphic display as a full image of impedance changes across the toolstring depth, and thus, for example, assist drillers in estimating the depth of stuck drill pipe or problematic stabiliser to wall friction points in the borehole.

The integration operation functions as a form of first-order low-pass filter, which can be performed in the continuous-time (analog) domain or approximated (simulated) in the discrete-time (digital) domain. The integrator may have a low pass filtering effect.

In a practical embodiment, the amplitude of the white noise may be about 3 to 10%, for instance about 5%, of the amplitude of the set rotational speed $\Omega_r$ signal as provided by the user control unit 34. Alternatively, the added noise amplitude may be selected at about, for example, 10 RPM rms (root mean squares) while the set rotation speed (as selected by unit 34) is kept at zero. A frequency spectrum of the white noise signal 218 may be limited to a preselected frequency range, for instance having similar cut-off frequencies as the high-pass circuit (amplifier 206 in combination with integrator 208) and low-pass filters 200, 202. Said frequency range is for instance about 0.1 to about 5 Hz. Herein, the lower and upper cut-off frequencies may be adjusted, depending on the expected or observed range of resonance frequencies in the tool string 12 and the limitations of the drive such as bandwidth and dead time of the motor and motor management system and bandwidth of the sensor(s) used.

The integrator 232 may be truncated at upper and lower limits depending on minimum and maximum drill string dimensions. Herein, the tool string 12 may typically comprise connected tool string sections. A typical drill pipe may have a length of about 31 foot (~10 m) and a specified outside diameter (e.g. 3½ inch, 4 inch, 5 inch, 5½ inch, 5⅞ inch, or 6⅝ inch (about 8.9 to 17 cm)). Tool string sections are generally provided with an internal fluid conduit, for instance having an inner diameter in the order of 1 to 6 inch (about 2.5 to 15 cm). The integrator 232 may therefore be truncated accordingly, for instance between ⅓₃ and ¹⁄₁₀₀₀ rad/(Nm*s).

An operator of the system may choose how often and how fast this automatic impedance matching should be performed.

Figure 11:
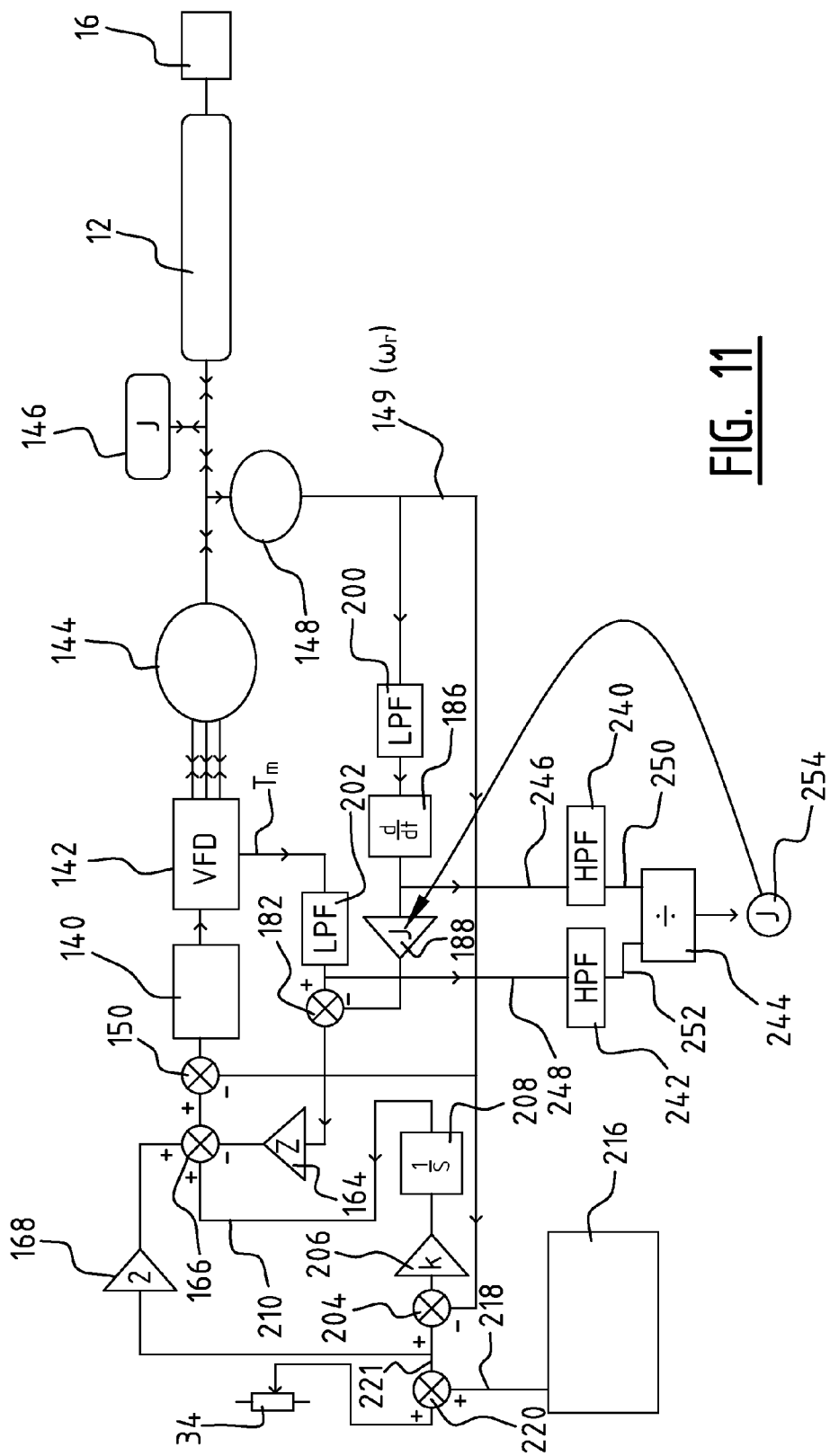

FIG. 11 shows an embodiment including a section to enable automatic sensing of the drive system rotational inertia J (as represented by block 146). Knowledge of this inertia value becomes relevant in embodiments where torque signal 162 cannot be derived directly from a torque sensor 160, for instance because such a toolpipe torque sensor may not be avialable.

Neglecting transmission losses, the equation of motion of the drive system output shaft is:

$$J * \frac{d}{dt}\omega_r = T \quad [Nm] \quad (12)$$

where J is the effective drive system inertia (including gear and drive motors) and T is the torque in [Nm] required to accelerate and decelerate the rotational inertia J and follows from the difference of the motor torque Tm and the torque applied to the tool string Ts. If no tool string is connected to the system, then torque T will be equal to the measured motor torque Tm. In practice, the difference between Tm and Ts may be slightly higher than the torque T required to accelerate the drive inertia J and stems from internal viscous or coulomb friction and may be accounted for. If no drill pipe torque sensor 160 is available to calculate T from Tm, then the inertia sensing method is best applied when the drive system is unloaded, i.e. without a drill string connected. Also please note that the required changing drive system speed may be generated from the white noise generator 216 in the same way as described in the embodiment of FIG. 10.

The inertia sensing section of the system of the invention includes a high pass filter 240, a high pass filter 242, and a divider element 244. The differentiated and low-pass filtered rotational speed signal 246, corresponding to a rotational acceleration in [rad/s²], is provided to the high-pass filter

240. The low-pass filtered motor torque Tm 248 with units [Nm] and now assumed to be torque T, is provided to the high-pass filter 242. The high-pass filtered signals 250, 252 are provided to respective inputs of the divider element 244, which divides signal 252 by signal 250, and outputs an inertia signal 254 from:

$$J = T \bigg/ \frac{d\omega_r}{dt} \qquad (12)$$

The inertia signal 254 is provided to amplifier 188, which uses said inertia signal as the gain factor thereof. The value J ([kg*m$^2$]) is to be determined only once prior to putting a system into service. Only when motors or gearboxes are changed, the procedure for determining the value of J should be repeated.

Other approaches for automatically determining the value J to be provided to amplifier 188 include intelligent analysis of a speed setpoint step response, whereby overshoot or undershoot in the resulting top drive speed is to be adjusted. Locations at or near surface allow accurate measurements of parameters using high-frequency sensors. High-frequency implies for instance exceeding 100 Hz.

Uphole rotary velocity $\omega_r$, torque Tm and/or torque Ts or a related parameter may for instance be measured by a sensor at or near surface. Suitable sensors include, for example, tacho generators or optical encoders, located either upstream or downstream of a gearbox, and (wireless) torque sensors in saver subs or instrumented internal blowout preventors (I-BOP) that may be present between a motor and the drill pipe shaft. Said related parameter is for example a time period between two pulses of an optical encoder that measures, for example, 1024 pulses for one rotation of the drill string 12 at an uphole location. The period between pulses is directly related to and representative of angular velocity. Alignment of top drive shafts can be poor, leading to unwanted distortion in sensed rotary velocity signal $\omega_r$. In a typical embodiment, the drill string rotational speed signal must be updated at rates far above the shaft revolutions per second rate. Angular dependent scale errors in the speed signal should thus preferably be compensated for in real time, for instance, by employing a self populating lookup table for each of the, for example, 1024 distinct angular encoder absolute shaft positions.

A driller operates the drilling rig (see FIG. 3) and sets a voltage input V representative of set rotational speed $\Omega_r$ via user control unit 34. In response to the voltage signal V, the drive system 30 will try to rotate the drill string 12 at the reference rotation $\Omega_r$. To rotate the drill string, the drive system 30 provides a motor torque Tm to the drive system inertia and the drill string 12. In response to the received motor torque Tm, the drill string and drill bit of the drilling system will rotate. In the system of the invention, only uphole components, which can be accurately measured, are required. Downhole measurements, at low sample rates, are obviated.

It is for instance sufficient to measure the rotary speed $\omega_r$ at the connection between the drive system and the drilling system, for instance using sensor 148. Sensor 148 may be a separate module, or may be included in the drive system 30.

The torque Tm can be derived from the current in the drive system 30. Alternatively, for modern AC drives torque signal Tm can be derived from variable frequency drive diagnostic outputs or in general from the motor management system. Otherwise, Ts can be measured accurately at or near the interface between the motor 144 and the tool string 12, for instance using sensor 160. The sensor 160 may be part of a wireless instrumented saver sub or IBOP (blow out preventer). Furthermore, torque signal Tm could even be derived by copying the commanded torque signal in between 140 and 142.

The system and method of the invention may be combined with the system and method of U.S. Pat. No. 5,117, 926 (commercially available under the name SOFT TORQUE). The combined systems may mitigate torsional waves even more than each system separately.

The system and method of the invention allow automatic operation. The only parameters required are the inertia of the drive system (which is known or can be automatically sensed, see FIG. 11) and the impedance $\zeta$ of the top section of a tool string (which may be calculated using tool string dimensions, see for instance formula (4), or can be determined automatically, see for instance FIG. 10). Please note that the impedance $\zeta$ is a real value, and is independent of the frequency of a torsional wave reaching the interface between the tool string and the drive system (see formula (7)). The system resolves resonances across a predetermined frequency range, rather than at a single selected frequency. Consequently, at least within said frequency range all waves reaching the drive system 30 are, at least partly, absorbed.

Figure 1:
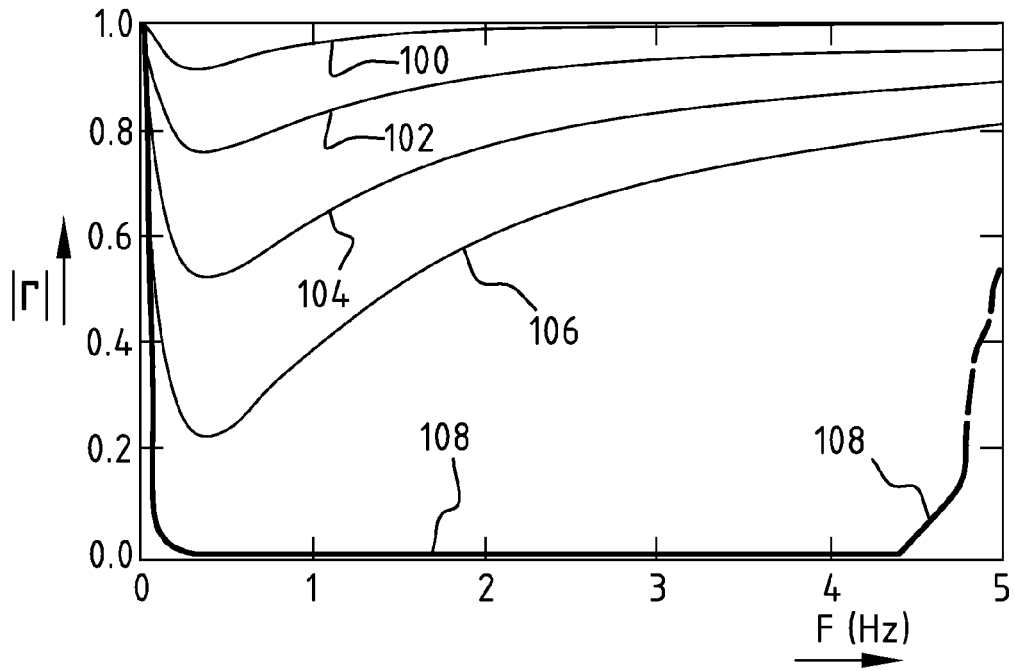
FIG. 1 shows a graph indicating amplitude of reflection coefficient r versus frequency of oscillations for various prior art control systems, and for a control system of the invention.
Figure 2:
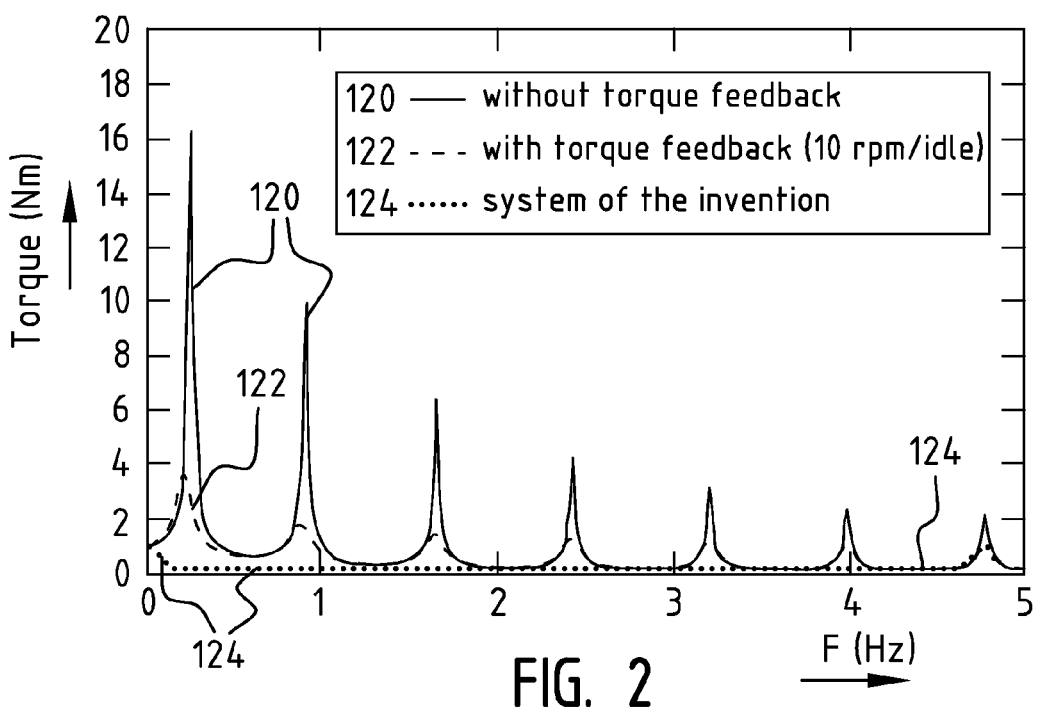
FIG. 2 shows a graph indicating amplitude of the drive torque versus frequency of oscillations for some prior art control systems, and for a control system of the invention.

Referring to FIGS. 1 and 2, lines 108 and 124 indicate reflection coefficient r and rotary torque T respectively, when using the system or method of the invention. Line 108 indicates that the reflection coefficient r is lowered over the entire selected frequency range (i.e. between the set high-pass and low-pass frequencies) rather than at one frequency only. Line 124 reflects the corresponding result, showing that all oscillation modes are equally reduced.

The method of the present invention realizes a simple, frequency-independent source output impedance at the drive system which is observed by all waves that travel upwards via the drill pipe. The system of the invention works, independent of the wavelength or amplitude of the waves, and independent of the inertia of the drive system.

Advantages of the method of the invention are:

a) Tuning towards actual drill string length and configuration of the BHA is obviated. The method is therefore easier to use and provides a more robust solution to obviate the problem of stick-slip vibrations;

b) Methods based on automatic tuning for the PI controller 140, such as for instance pioneered with Bentec and Shell's Mark iii Soft Torque System, NOV's SoftSpeed® II, and others, which typically fail when alien signals, for instance from offshore drillrig heaves, are present, are obviated;

c) Multiple modes are dealt with in parallel. The system dampens unwanted oscillations at all frequencies within a selected frequency range (for instance 0.1 to 5 Hz) at once;

d) Even when torque signals are wrongly scaled, the system can still work out how to rescale in order to achieve optimal impedance matching.

The term "uphole" may refer to locations at surface or above surface (e.g. from the seabed up to the water surface in off-shore operations). In addition, the term uphole may refer to locations near the surface end of the borehole, less then, for example, 20 m below the earth surface. The term "downhole" may refer to locations within, or near the opposite end of the borehole, for example, 200 m from the lower end of the drill string or 10 m below sea level. Suitably, the drill string is provided with a drill bit at the downhole end thereof.

It will be obvious to those familiar in the art that the same methods as disclosed herein will work for hydraulic or pneumatically actuated (top) drives commonly found on drilling rigs.

Axial vibrations—the same impedance matching concepts can be applied to combat axial waves travelling up and down the drill string (e.g. bit bounce).

Although explained by example as method for electric top drives, it will be obvious to those familiar in the art that similar concepts can be used at (multiple) downhole and/or mid-string (mud)motors or turbines commonly used in (directional) drilling. Such use could be as standalone system, with or without similar impedance matching systems with top drives that may or may not be set by drillers to rotate at a (low) RPM. An example of such embodiment could be an extra system at the twist-off sensitive delicate transition between drill pipe and drill collars, or at transitions between sections of different drill pipe diameter, weight or grade.

The following paragraphs provide background information and elaborate on terms used in this disclosure. Conventions in literature are not always consistent with terms used in some of the cited publications.

Angular velocity equals rotational speed. It is expressed, for instance, in radians per second [rad/s] or in revolutions per minute (RPM) of a drill string or motor shaft.

A positive torque multiplied by a positive rotational (clockwise when facing downstream) speed corresponds with a positive energy flow (power) in a downstream (top drive to drill string to bit) direction.

By default, in this disclosure, torsional mechanical impedance z is expressed in [rad/(Nm*s)]. In the electrical world the characteristic impedance of a transmission line is normally indicated by Z, having units [V/A]. In the mechanical world there are two schools of modelling:

1. One treating Mechanical Speed as Volts and Mechanical Torque as Amperes; and
2. One treating Mechanical Speed as Amperes and Mechanical Torque as Volts.

In the present description, the first school of modelling is used and thus (to be consistent with the electrical naming convention) the following definition of z is used:

(Torsion)characteristic impedance=z [rad/Nm*s] (=(rotation)speed/torque))

Note that in the mechanical world we are also using the term "mobility" with speed/torque units ([rad/Nm*s]), which is clearer with respect to the units. Therefore we might also label "characteristic impedance" of a mechanical transmission line as the "characteristic mobility". Herein, it is chosen to use z (with label "characteristic impedance" and units [rad/Nms]) in the control diagram where a set-point for z is calculated from pipe torque and rotational speed. This in contrast to the 1/Z value, which has been used in other publications like SPE 18049 and which can be better regarded as the characteristic admittance, having units [Nm*s/rad].

The symbols Z and ζ may be used to indicate the characteristic impedance of the tool string. Drive system (source) impedance may be indicated by the symbol Z or z.

The control system of the invention comprises feedback of both torque and rotational speed signals into a controller. An objective of said controller is to maintain the drive speed over torque ratio equal to the connected drill pipe impedance Z. A secondary objective, for lower frequencies, is to approach and maintain a setpoint speed as drive rotation speed. The system includes a rotational speed sensor and a torque sensor, with the latter optionally replaced by a motor torque signal already available from a variable frequency drive (VFD) for an AC motor and the current safeguarding signal for a DC motor.

The present invention is not limited to the above-described embodiments thereof, wherein many modifications are conceivable within the scope of the appended claims. Features of respective embodiments may for instance be combined.

The invention claimed is:

1. A method of damping vibrations in a tool string, said vibrations comprising torsional waves propagating along said tool string, the method comprising the steps of:
   instructing a drive system having a drive system inertial (J) to rotate the tool string at a set rotational speed ($\Omega_r$);
   determining a rotational speed ($\omega_r$) of the tool string;
   determining a torque ($T_d$) proximate an interface between the tool string and the drive system;
   determining a tool string impedance ($\zeta$) of a section of the tool string adjacent said interface;
   calculating a rotation correction signal using the determined torque ($T_d$) multiplied by the determined tool string impedance ($\zeta$);
   correcting the set rotational speed ($\Omega_r$) using the rotation correction signal to provide a corrected set rotational speed ($\omega_{r,cor}$) signal;
   subtracting the determined rotational speed ($\omega_r$) from the corrected set rotational speed signal to provide a twice corrected set rotational speed ($\Omega_{r,2cor}$) signal to the drive system, wherein the twice corrected set rotational speed ($\Omega_{r,2cor}$) signal urges the drive system to follow the corrected set rotational speed ($\Omega_{r,cor}$) signal to ensure that the drive system inertia seen by torsional waves propagating along said tool string towards the drive system, approaches zero thereby rendering an effective impedance frequency independent.

2. The method of claim 1, wherein the tool string drives a pump device.

3. The method of claim 1, wherein the step of correcting the set rotational speed includes:
   multiplying the set rotational speed by a predetermined factor; and
   subtracting the rotation correction signal from the multiplied set rotational speed ($\Omega_r$) to provide the corrected set rotational speed ($\Omega_{r,cor}$) signal.

4. The method of claim 3, wherein the predetermined factor is 2.

5. The method of claim 1, wherein the step of calculating a rotation correction signal comprises:
   calculating a torque correction signal using the determined rotational speed ($\Omega_r$) of the tool string and the inertia J of the drive system; and
   subtracting said torque correction signal from the motor supplied torque (Tm), providing a corrected torque signal ($T_{cor}$); and
   using the corrected torque signal ($T_{cor}$) instead of the determined torque ($T_d$).

6. The method of claim 5, wherein the step of calculating a torque correction signal includes:
   determining a time differential signal of the rotational speed ($\omega_r$) of the tool string to provide a tool string rotational acceleration signal;
   amplifying the tool string rotational acceleration signal by a gain factor G, wherein the gain factor G is substantially equal to the inertia (J) of the drive system.

7. The method of claim 6, comprising the steps of:
   calculating the gain factor G using the tool string rotational acceleration signal and a torque signal (T).

8. The method of claim 7, wherein the torque signal is selected from: determined torque (Td), motor torque (Tm), and corrected torque signal ($T_{cor}$).

9. The method of claim 1, including the step of equally low-pass filtering the torque signal (T) and speed signal.

10. The method of claim 1, comprising the steps of:
periodically adding a step pulse to the set rotational speed ($\Omega_r$);
determining a ratio of an amplitude of said step pulse and an amplitude of a resulting step in determined rotational speed ($\omega_r$);
automatically adjusting the impedance gain value (z') accordingly, so that said ratio approaches the value of 1.

11. The method of claim 1, comprising the steps of:
adding a white noise signal to the set rotational speed ($\Omega_r$);
calculating a tool string spatial image via a cross-correlation function using the white noise signal and a sum of the observed rotational speed ($\omega_r$) and the rotation correction signal;
observing from said cross correlation function a discrepancy remaining between an estimated tool string impedance and an implemented drive impedance;
adjusting the impedance gain value (z') in accordance with the observed discrepancy; and
using said adjusted impedance gain value (z') as updated impedance gain factor (z') in the step of calculating the rotation correction signal.

12. The method of claim 11, wherein the cross-correlation function is calculated at set time intervals.

13. The method of claim 12, wherein the cross-correlation function is calculated as background process while idling or during steady-state operation of the tool string.

14. The method of claim 12, wherein the time interval is in the range of 10 to 30 seconds.

15. The method of claim 1, comprising the step of:
providing the twice corrected set rotational speed ($\Omega_{r,2cor}$) signal to a speed controller of the drive system, the speed controller having a gain of at least 10,000 Nms/rad.

16. A control system for damping vibrations in a tool string, said vibrations comprising torsional waves propagating along said tool string, the system comprising:
a user control module for instructing a drive system to rotate the tool string at a set rotational speed ($\Omega_r$);
a sensor for determining a rotational speed ($\omega_r$) of the tool string;
a torque sensor for determining a torque ($T_d$) proximate an interface between the tool string and the drive system;
a calculator for determining a tool string impedance ($\zeta$) of a section of the tool string adjacent said interface;
a first feedback loop comprising an amplifier for multiplying said torque (T) by the determined tool string impedance ($\zeta$), for providing a rotation correction signal, and for correcting the set rotational speed ($\Omega_r$) using the rotation correction signal to provide a corrected set rotational speed ($\Omega_{r,cor}$) signal;
a second feedback loop for subtracting the determined rotational speed ($\omega_r$) from the corrected set rotational speed ($\Omega_{r,cor}$) to provide a twice corrected set rotational speed ($\Omega_{r,2cor}$) signal to the drive system;
wherein the twice corrected set rotational speed ($\Omega_{r,2cor}$) signal urges the drive system to follow the corrected set rotational speed ($\Omega_{r,cor}$) signal to ensure that the drive system inertia seen by torsional waves propagating along said tool string towards the drive system, approaches zero thereby rendering an effective impedance frequency independent.

17. The system of claim 16, comprising a pump device drivably connected to a downhole end of the tool string.

18. The system of claim 16, comprising a third corrective loop to adjust the tool string rotational speed ($\omega_r$) to the set rotational speed ($\Omega_r$).

19. The system of any of claim 16, comprising a speed controller for controlling the speed of the drive system, the speed controller having a gain of 10,000 Nms/rad or more.

* * * * *